(12) United States Patent
Chai et al.

(10) Patent No.: US 10,090,896 B2
(45) Date of Patent: Oct. 2, 2018

(54) WIRELESSLY TRANSMITTING MULTI-CAST SIGNAL USING RATELESS CODES

(71) Applicant: HEWLETT-PACKARD DEVELOPMENT COMPANY, L.P., Houston, TX (US)

(72) Inventors: Eugene Chai, Palo Alto, CA (US); Kang Shin, Palo Alto, CA (US); Sung-Ju Lee, Palo Alto, CA (US); Jung Gun Lee, Palo Alto, CA (US); Raul Hernan Etkin, Palo Alto, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 98 days.

(21) Appl. No.: 14/760,693

(22) PCT Filed: Jan. 14, 2013

(86) PCT No.: PCT/US2013/021497
§ 371 (c)(1),
(2) Date: Jul. 13, 2015

(87) PCT Pub. No.: WO2014/109774
PCT Pub. Date: Jul. 17, 2014

(65) Prior Publication Data
US 2015/0358058 A1    Dec. 10, 2015

(51) Int. Cl.
*H04B 7/04*    (2017.01)
*H04B 7/0456*    (2017.01)
(Continued)

(52) U.S. Cl.
CPC .......... *H04B 7/0456* (2013.01); *H04B 7/0413* (2013.01); *H04B 7/068* (2013.01); *H04B 7/0626* (2013.01); *H04B 7/0667* (2013.01)

(58) Field of Classification Search
CPC ..... H04B 7/046; H04B 7/0473; H04L 1/0002; H04L 1/0009; H04L 1/0015;
(Continued)

(56) References Cited

U.S. PATENT DOCUMENTS

2006/0239370 A1* 10/2006 Mody ................. H04L 27/2659
                                                                         375/260
2008/0152061 A1* 6/2008 Kozat ................... H04L 1/0002
                                                                         375/358
(Continued)

FOREIGN PATENT DOCUMENTS

WO    WO-2006-047918      5/2006

OTHER PUBLICATIONS

International Searching Authority, International Search Report and Written Opinion, PCT/US2013/021497, dated Sep. 27, 2013.
(Continued)

*Primary Examiner* — Ian N Moore
*Assistant Examiner* — Ronald H Davis
(74) *Attorney, Agent, or Firm* — Mahamedi Paradice LLP

(57) ABSTRACT

Data is transmitted over a wireless network by encoding data using a rateless code. A multi-cast signal is wirelessly transmitted to communicate the encoded data for any one or more receivers. The wireless transmission is performed in a manner that is agnostic as to a number of antennas that are utilized by each of the one or more receivers.

10 Claims, 4 Drawing Sheets

(51) Int. Cl.
*H04B 7/06* (2006.01)
*H04B 7/0413* (2017.01)

(58) Field of Classification Search
CPC ............. H04L 27/2659; H04L 27/2663; H04L 27/2665; H04L 27/2675; H04L 27/2678; H04L 27/266
See application file for complete search history.

(56) References Cited

U.S. PATENT DOCUMENTS

| | | | |
|---|---|---|---|
| 2008/0175163 A1* | 7/2008 | Honary | H04W 28/22 370/252 |
| 2010/0046445 A1 | 2/2010 | Sawahashi et al. | |
| 2010/0189167 A1* | 7/2010 | Pare, Jr. | H04L 5/0007 375/219 |
| 2010/0226415 A1* | 9/2010 | Mehta | H04L 1/0625 375/219 |
| 2011/0149824 A1 | 6/2011 | Tong et al. | |
| 2013/0315211 A1* | 11/2013 | Balan | H04B 7/0697 370/336 |
| 2014/0022982 A1* | 1/2014 | Kim | H04L 1/0077 370/315 |

OTHER PUBLICATIONS

Bursalioglu, O.Y. et al., Joint Source-channel Coding for Deep-space Image Transmission Using Rateless Codes, (Research Paper), Oct. 3, 2012, 36 Pgs.

Fekri, F. et al., Scalable Video Multicast via Rateless Coding in Distributed Networks., (Research Paper), Jan. 19, 2010, 2 Pgs.

* cited by examiner (Time Domain)

WIRELESSLY TRANSMITTING MULTI-CAST SIGNAL USING RATELESS CODES

BACKGROUND

The growing demand for real-time streaming video on portable devices has highlighted the importance of multimedia multicast in mobile wireless networks. In many wireless networks (e.g., an orthogonal frequency division multiplexing (OFDM) communication system), a transmitter modem is typically responsible for encoding the digital information and modulating it onto an analog carrier signal, and subsequently, a receiver modem demodulates and decodes the digital information. For the receiver modem to successfully receive the analog carrier signal in such systems, the carrier signals need to be transmitted in a way that is comprehensible to the receiver's antenna(s) at a physical layer (PHY) level. In other words, the transmitter typically needs to customize the PHY frames of the data stream to the number and capability of the antennas equipped with the receiver in order to facilitate successful data communication.

With the advancement in silicon manufacturing technologies, a single mobile device may now be equipped with more than one antenna, and each antenna may vary in type. The use of multiple antennas at both the transmitter and receiver in a wireless radio network (e.g., to improve performance) is referred to as multiple-input-multiple-output ("MIMO").

DETAILED DESCRIPTION

Figure 1:
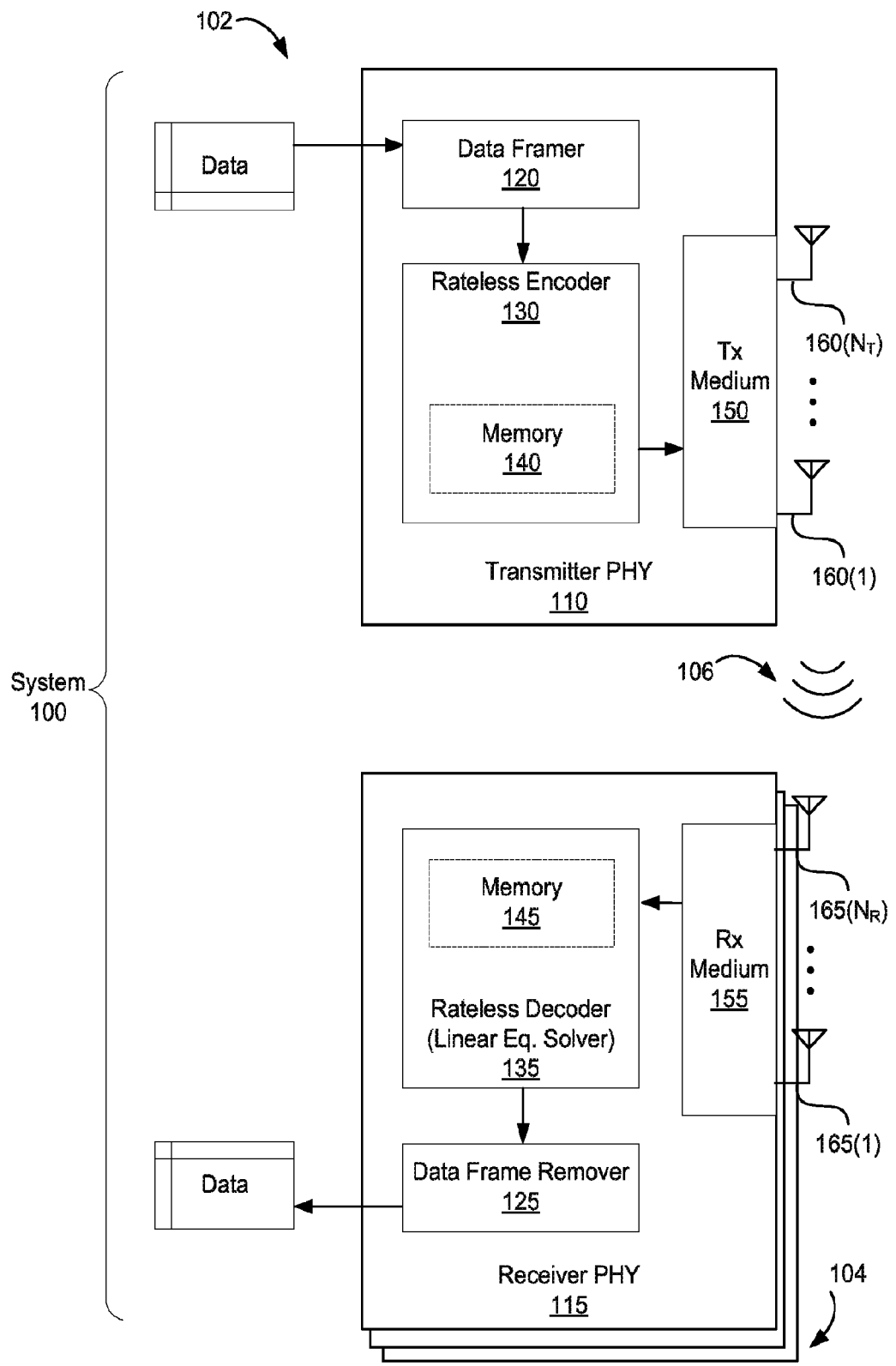
FIG. 1 illustrates an exemplary system for transmitting and receiving data without regard for the number of antennas that are included on one or more receiving devices.

Techniques are disclosed for agnostically multicasting data from a transmitter to a plurality of receivers, and more specifically, for transmitting and receiving data without regard for the number of antennas that are included on one or more receiving devices.

In an example, data is transmitted over a wireless network by encoding data using a rateless code. A multi-cast signal is wirelessly transmitted to communicate the encoded data for any one or more receivers. The wireless transmission is performed in a manner that is agnostic as to a number of antennas that are utilized by each of the one or more receivers.

In another example, a wireless transmitter includes a physical layer and an encoder. The physical layer forms an uncoded frame that includes multiple data symbols representing a set of data. An encoder converts data using the rateless code into a coded frame. The coded frame includes multiple coded blocks that collectively include multiple copies of the plurality of data symbols. The encoder loads the coded blocks onto a plurality of subcarriers, and one or more antennas transmit the plurality of subcarriers for the one or more receivers.

Examples described herein recognize that in a MIMO environment, multiple receivers may be present that have different capabilities. For example, some receiver devices (e.g., mobile phones) can be equipped with more antennas than other devices (e.g., laptop computers), and further that two devices may also include antennas that are of different types. Additionally, not all receivers are located in the same kind of receiving environment. Examples further provided herein recognize that in conventional wireless multicast schemes, a multicasting transmitter often has to configure (and reconfigure) its transmission signals so as to accommodate a receiving user with inferior antennas to ensure successful transmission to all receivers. This approach puts those receivers with superior antennas in a disadvantageous position because their superior antenna capabilities are unnecessarily wasted. In contrast to such conventional approaches, examples described herein achieve successful wireless multicast of data signals to all heterogeneous receivers without sacrificing those receivers with superior antenna capabilities.

In some examples, data is encoded for wireless transmission using a rateless code, and a signal is wirelessly transmitted that communicates the encoded data for any one or more receivers. The wireless signal is transmitted in a manner that is agnostic as to a number of antennas that are utilized by each of the one or more receivers. In this way, the examples provided herein enable successful wireless multicast of data signals to all heterogeneous receivers without sacrificing those receivers with superior antenna capabilities.

As used herein, the term "agnostic" or "agnostically" means "without regard," and in the context of wireless transmission to one or more receivers, "agnostic" specifically means that no specific configuration is made in transmitting to a signal based on a number of antennas that are utilized on any receiving device(s) for the signal.

Among other benefits, examples described herein have an increasingly greater applicability to every day uses. For example, the ubiquity of high-bandwidth MIMO wireless networks has created a high demand for real-time multicast video streaming applications on mobile devices. Examples include group video conferencing between participants from multiple sites and live broadcast of a live event to multiple devices at a public location (e.g., in an airport lounge) served by a hot-spot.

System Overview

FIG. 1 illustrates an example system 100 that is capable of transmitting and receiving data in a manner that is agnostic as to a number of antennas used on one or more receiving devices. The system 100 includes a transmitter 102 and a receiver 104. The transmitter 102 and receiver(s) 104 are coupled in communication for data transmission over the channel 106. For example, the components may be connected via a WIFI network, a Worldwide Interoperability for Microwave Access ("WIMAX") network, a wireless telephony network (e.g., Global System for Mobile Communications ("GSM"), Code Division Multiple Access ("CDMA") or Long Term Evolution ("LTE")), or any type of suitable wireless communication network.

An example of FIG. 1 illustrates an implementation with transmitter 102 and one or more receivers 104. In an example of FIG. 1, multiple receivers can be provided that have differing antenna arrangements and numbers. As such, system 100 illustrates a heterogeneous multi-cast network. A prominent characteristic of a multicast network is its heterogeneity in both the channel states and the MIMO capabilities of its clients (e.g., different types of computing devices are present in a network system). An example such as provided with system 100 recognizes that conventional wireless multicast schemes adapt poorly to such heterogeneity. Also, many of such conventional networks predominantly consist of energy constrained, heterogeneous MIMO mobile wireless devices.

In order to support heterogeneity in multicast networks, system 100 addresses channel state factors which can otherwise limit multi-casting to multiple heterogeneous devices. In particular, heterogeneity of the temporally varying channel conditions at different mobile receivers forces a conventional multicast scheme to conservatively select a diversity-multiplexing operating point to ensure that the bit error rate ("BER") of the channel is acceptable for a client (or a receiving device) with the lowest signal-to-noise ratio ("SNR"). For example, in order to maintain a minimum video quality to each receiver, transmit diversity may have to be increased at the expense of additional independent streams due to a client with a low-SNR channel. This unfairly penalizes receivers with higher-SNR (i.e., better) channels that may otherwise receive the video at a higher bit rate.

Additionally, examples described herein recognize that due to the heterogeneity of the number of receive antennas, the spatial multiplexing gain of the entire multicast group can, under conventional schemes, be unfairly upper-bounded by the device with the fewest number of antennas. More specifically, in conventional schemes, the cost of tracking the hardware capabilities of all receivers 104 can be excessive in the presence of a high receiver churn. Hence, a conventional multicast transmitter is forced to make a conservative decision in employing any additional spatial dimension, thereby sacrificing multimedia data quality and bit rate. The inability of conventional multicast schemes to compensate for antenna heterogeneity severely limits the video multicast capacity.

Further, examples described herein recognize that conventional multicast schemes lack support to satisfy contemporary efficient multicast group management and MIMO power efficiency requirements. For example, for energy-constrained mobile devices, it is typically desirable to maximize the number of bits per-watt of energy spent. However, while throughput may increase with the number of receive antennas employed, increasing the number of antennas does not necessarily improve the bits-per-watt metric. The aforementioned heterogeneity, again, complicates this optimization process as the optimal energy-efficient operating point is different for each receiving device (or client). The selections of antennas and frame counts depend on the channel state of the client. In a multicast network, examples provided herein recognize that it is beneficial for a client to select an operating point that is optimal according to its own local channel conditions for an energy efficient transmission. Making adjustments solely from the transmitting device (e.g., by increasing the number of transmitted spatial streams) may benefit some clients but penalize others.

Examples described herein address these and other shortcomings of many conventional approaches for handling multi-cast transmissions in a heterogeneous environment. With regard to system 100, rateless coding in the antenna domain generates a stream of coded symbols that are agnostic as to the number of antennas in use at the receiver or receivers. More specifically, a multimedia multicast scheme is provided that is based upon a rateless code applied at the physical layer (PHY) that may provide power-efficient, agnostic data transmission in a wireless multicast environment. Among other benefits, transmitter 102 can omit probing the state of channel 106 to every client, as is typically performed by conventional schemes to ensure that clients are grouped by antenna count.

Among other benefits, system 100 can support contemporary wireless networks which increasingly include devices of varying numbers of antennas. For example, some smart phones may only have one wireless-fidelity ("WIFI") antenna because of space and energy constraints while laptop computers may have three or more WIFI antennas.

Furthermore, the receiver(s) 104 of system 100 can automatically adjust the peak signal-to-noise ratio ("PSNR") of the received multicast data stream (e.g., audio/video signals) to match both the instantaneous channel state and the number of active receiving antenna(s) of the receiving device. One or more examples may optimize energy use by adjusting either the PSNR or PSNR-per-Joule value of the received multicast stream on each individual receiver while ensuring that the received video bit rate remains above the target value.

Transmitting

In more detail, transmitter 102 includes a transmitter physical layer (PHY) 110, which includes a data framer 120, a rateless encoder 130, and a transmission medium 150. As illustrated in FIG. 1, the transmission medium 150 (e.g., a WIFI transmitter) is coupled to one or more antennas $160(1)$-$160(N_T)$ for signal transmission. For simplicity, the antennas $160(1)$-$160(N_T)$ are illustrated to be the same type of antenna; however, the antennas $160(1)$-$160(N_T)$ may include any one or more types of antennas suitable for wireless connection in the network system 100. The transmitter PHY 110 can also include hardware and components to implement various functions of the transmitter PHY 110. The rateless encoder 130 can include control logic (not shown for simplicity) and one or more suitable computer-readable memory 140 to store instructions that, when executed, causes the control logic in the encoder 130 to perform the encoding process as described below.

Figure 2:
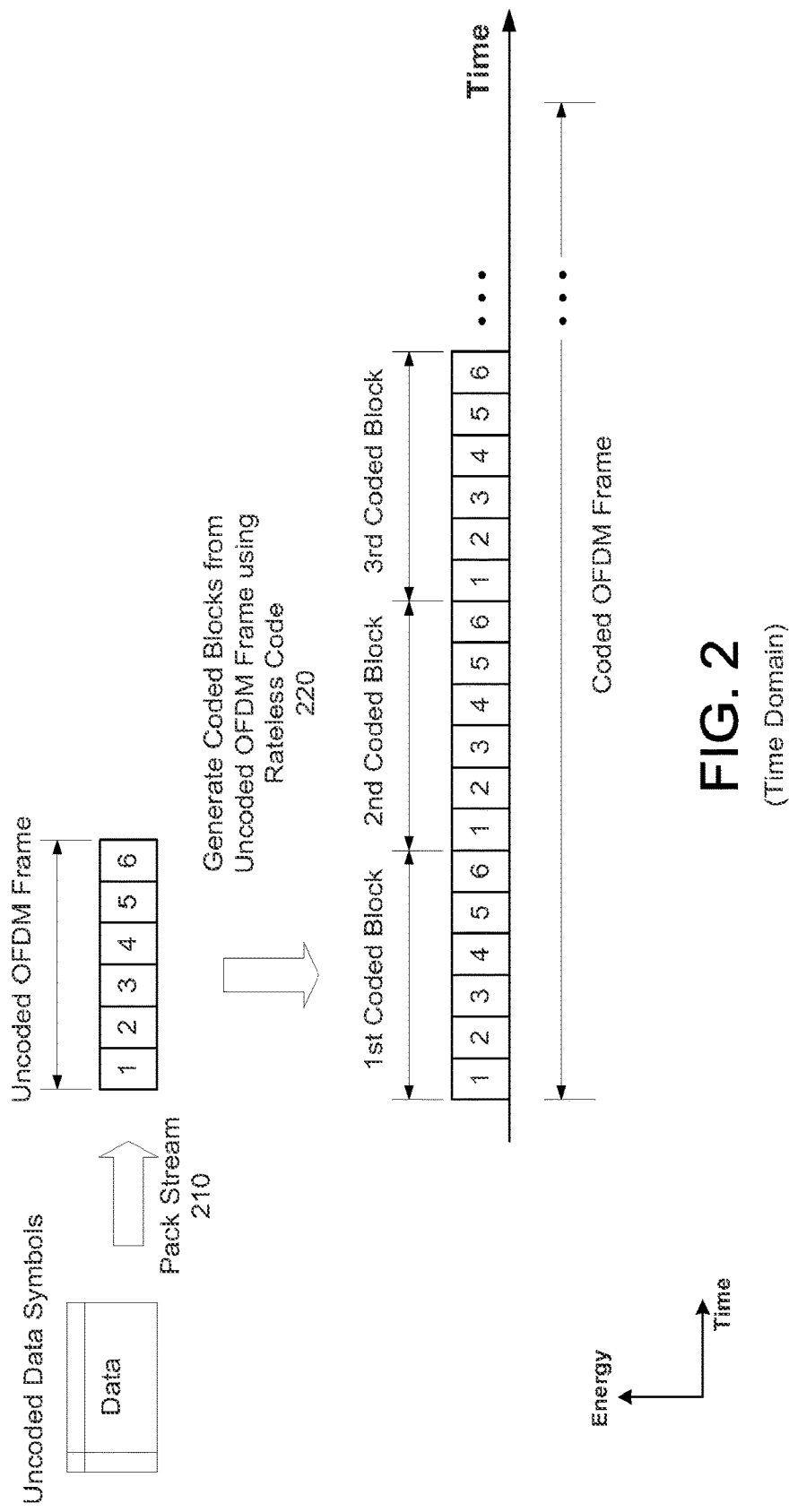
FIG. 2 is an exemplary diagram illustrating the rateless encoding process which may be performed by the transmitter of FIG. 1.

FIG. 2 illustrates an example rateless encoding process. In particular, a rateless encoding process 200 can be implemented using, for example, the transmitter 102 of an example of FIG. 1. In one implementation, the data framer 120, the rateless encoder 130, and the transmission medium 150 combine to perform the rateless encoding process 200 and wireless multicast transmission techniques disclosed herein.

With reference to FIG. 1 and FIG. 2, rateless multicasting can be implemented using network system 100. In one example, transmitter PHY 110 first receives the data for wireless transmission in the form of a stream of uncoded data symbols. The data framer 120 packs the stream of uncoded data symbols into one or more uncoded orthogonal frequency division multiplexing ("OFDM") frames (210). Each uncoded OFDM frame includes $N_{sym}$ OFDM symbols. In an example of FIG. 2, the $N_{sym}$ is selected to be equal to 6 but can be varied based on design and implementation considerations.

Each uncoded OFDM symbol can be processed using a rateless code (the details of which are described below) to form a fully coded OFDM frame so that each symbol is replicated across multiple coded blocks (220). In one implementation, the rateless encoder 130 selects a code rate and generates ratelessly-coded symbols at the chosen code rate. As shown in FIG. 1, the transmitter 102 is coupled to a number of $N_T$ transmit antennas. The code rate of the rateless encoder 130 can be based on the following parameters: (1) the number of spatial streams per subcarrier, which is denoted by $N_D$, and (2) the number of blocks, which is denoted by $N_B$. Let $N_{SC}$ be the number of OFDM subcarriers in each uncoded frame, and let $X_n$ be an $N_D \times N_{SC}$ matrix that represents the $n^{th}$ OFDM symbol, where $n \in \{1, \ldots, N_{sym}\}$. Each of the $N_{SC}$ columns of $X_n$ represents a subcarrier that is used to transmit $N_D$ data symbols in separate spatial streams. Also, let $x_{n,s}$ be the $s^{th}$ column vector of $X_n$, where $s \in \{1, \ldots, N_{SC}\}$. In this way, $X_n$ may be expressed as:

$$X_n = [x_{n,1}, \ldots, x_{n,N_{SC}}] \quad \text{(Eq. 1)}$$

Note that $x_{n,s}$ also represents the $N_D$ data symbols mapped to the $s^{th}$ subcarrier of the uncoded OFDM frame. Also, unless otherwise indicated, all vectors are column vectors.

Let $Y_{n,b}$ be the $n^{th}$ coded OFDM symbol in the $b^{th}$ block, where $b \in \{1, \ldots, N_B\}$, then $Y_{n,b}$ can be expressed as:

$$Y_{n,b} = K(P_b X_n^T)^T = K X_n P_b^T \quad \text{(Eq. 2)}$$

where K is an $N_T \times N_D$ complex-valued antenna mapping matrix, $P_b$ is an $N_{SC} \times N_{SC}$ subcarrier permutation matrix, and $(\bullet)^T$ indicates a non-Hermitian transpose. Note that, in order to avoid distorting the transmit power of the original data symbols, each column and row of K must have a norm of 1. After the rateless encoding, the processed data is sent from the rateless encoder 130 to the transmission medium 150, and is transmitted (or multi-cast) via antennas 160(1)-160($N_T$), through channel 106, to one or more receivers 104.

With implementation of a process such as described with FIG. 2, the transmitter 102 can perform a multi-cast broadcast in a heterogeneous environment, and the broadcast can be agnostic as to a number of antennas that are in use by any device that receives the transmission.

Receiving

Each of the one or more receivers 104 includes a receiver physical layer (PHY) 115, which includes a data frame remover 125, a rateless decoder 135, and a receiving medium 155. As illustrated in FIG. 1, the receiving medium 155 (e.g., a WIFI receiver) is coupled to one or more antennas 165(1)-165($N_R$) for signal reception. For simplicity, the antennas 165(1)-165($N_R$) are illustrated to be the same type of antenna; however, the antennas 165(1)-165($N_R$) may include any one or more types of antennas suitable for wireless connection in the network system 100. Together with other components (e.g., a phase-locked loop circuit, not shown in FIG. 1 for simplicity), the receiver PHY 115 implements the fundamental reception functionalities of a PHY compatible to the network system 100. The rateless decoder 135 may include control logic (not shown for simplicity) and one or more suitable computer-readable memory 145 to store instructions that, when executed, causes the control logic in the decoder 135 to perform the decoding process as described below.

According to some examples, the encoded data received by the antennas 165(1)-165($N_R$) represents a number of linear equations, and the rateless decoder 135 may decode the data by solving unknown coefficients in the plurality of linear equations. One or more examples provide that the decoding is performed based on the number of linear equations received and irrespective of the total number of antennas that are utilized by the receiver. In some implementations, the decoding is based on the antenna mapping matrix K and a channel state matrix H.

More specifically, when data signals multi-cast from the transmitter 102 are received via antennas 165(1)-165($N_R$), the receiving medium 155 sends the received data signals to the rateless decoder 135 for decoding. For simplicity, the decoding process is explained in the context of recovering $x_{1,1}$, which represents the $N_D$ data symbols mapped to the first subcarrier of the first uncoded OFDM symbol. In implementation, similar decoding techniques may be applied to recover all desired data that is ratelessly-encoded by the encoding techniques described above.

Methodology

Figure 3:
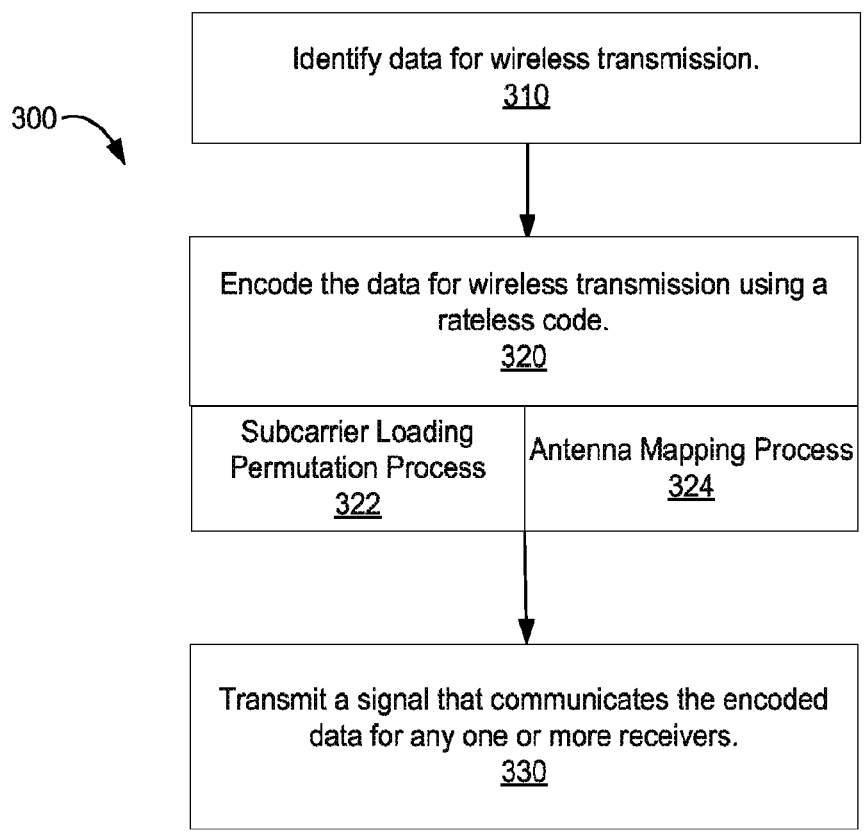
FIG. 3 illustrates an exemplary method for transmitting data agnostic of antennas of receivers.
Figure 4:
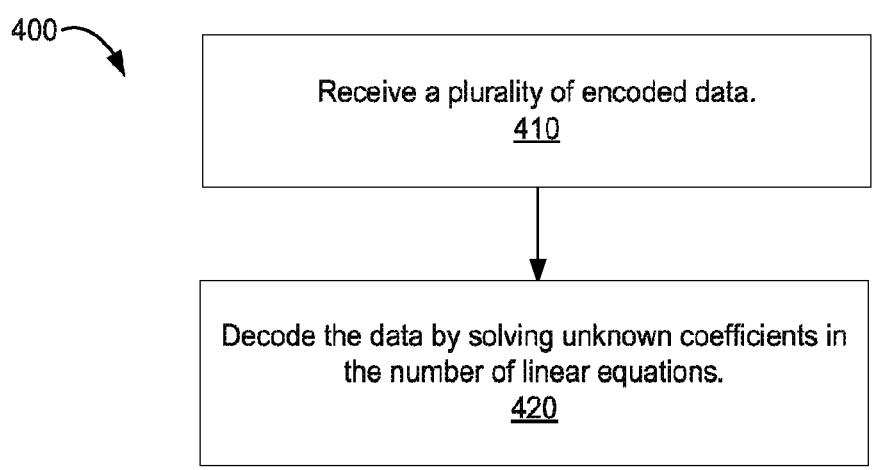
FIG. 4 illustrates an exemplary method for receiving agnostically transmitted data.

FIG. 3 illustrates an example method 300 for operating a transmitter to signal multiple receivers of a heterogeneous environment in a manner that is agnostic of antenna number. FIG. 4 illustrates an example method 400 for operating a given receiver to process an encoded signal that is communicated agnostically of antenna number in a heterogeneous environment. In describing the examples of FIG. 3 and FIG. 4, reference is made to elements of prior examples for purposes of illustrating a suitable component or element for performing a step or sub-step being described.

With reference to FIG. 3, data is identified by the transmitter PHY 110 for wireless multicast transmission (310). For example, the data can correspond to content (e.g., from a live event) that is to be broadcast to multiple devices within range of a wireless transmitter.

The identified data is encoded by the rateless encoder 130 for wireless transmission using a rateless code (320). As described with an example of FIG. 2, the transmitter 102 can pack streams of uncoded data (corresponding to data identified for transmission in (310)) into a set of uncoded OFDM frames. Each uncoded OFDM frame can be replicated across multiple coded bocks using a rateless code to form a fully coded OFDM frame. In this context, the encoder can implement a process for implementing a subcarrier loading permutation process (322), and/or antenna mapping (324).

(a) Subcarrier Loading Permutation Process (322).

In some examples, the rateless encoder 130 may place (or load) repetitive data in the coded OFDM frame on a different subcarrier based on the subcarrier permutation matrix $P_b$. More specifically, in one or more examples, the permutation matrix $P_b$ cyclically rotates the columns of X such that:

$$X_n P_b^T = [x_{n,b}, \ldots, x_{n,N_{SC}}, x_{n,1}, \ldots, x_{n,b-1}] \quad \text{(Eq. 3)}$$

The permutation matrix $P_b$ ensures that each data symbol in the OFDM symbol is transmitted over different subcarriers in different coded blocks. This increases the probability that the different linear combinations of the OFDM symbol from different coded blocks are independent (and thereby creates more linearly independent equations for solving unknown coefficients during the decoding). This subcarrier loading permutation technique can be implemented in frequency-selective fading channels where the channel state of different subcarriers may differ significantly. It is noted that the constraint $N_B \leq N_{SC}$ is selected to prevent any repeated permutations. In some examples, the permutation matrix is performed according to a state of the channel 106 of the wireless network 100.

(b) Antenna Mapping Process (324).

As an addition or alternative, the rateless encoder 130 can map a vector of data in each subcarrier onto the antennas 160(1)-160($N_T$) based on the antenna mapping matrix K for signal transmission. If a length of the vector of data in the subcarrier equals the total number of antennas of the transmitter, then the encoder 130 sends a stream of subcarriers on each available spatial dimension to the transmission medium 150 for signal transmission. However, if a length of the vector of data in the subcarrier is less than the total number of antennas of the transmitter, then the encoder 130 periodically sends a stream of subcarriers on a different spatial dimension to the transmission medium 150 for signal transmission. More specifically, the mapping matrix, K, ensures that length-$N_D$ vector of data symbols in each subcarrier is mapped onto the transmitting antennas 160(1)-160($N_T$). This mapping aspect controls the spatial-multiplexing tradeoff at the transmitter 102. If $N_D=N_T$, then the transmitter 102 sends one data stream on each available spatial dimension. On the other hand, if $N_D<N_T$, then "transmit diversity" is used in addition to spatial multiplexing.

It is noted that K may be a fixed, predefined matrix, or alternatively may be generated using a well-known random number generator ("RNG"). Nonetheless, the matrix K is known to both the receiver 104 and the transmitter 102 for correct decoding.

The encoded data are sent to the transmission medium 150, and a signal that communicates the encoded data is wirelessly multi-cast by the transmitting antennas 160(1)-160($N_T$) (330). In this regard, the wireless transmission is agnostic of a number of antennas that each receiver utilizes to process the wireless transmission.

With reference to an example of FIG. 4, encoded data is received by the receiving medium 155 of a given receiver. The receiver can include any one or more antennas 165(1)-165($N_R$) (410). In one implementation, the encoded data can be represented as a number of linear equations.

Next, the received data are decoded by the rateless decoder 135. In one implementation, the decoding is performed by solving unknown coefficients in the linear equations that represent the encoded data (420). By way of example, let $H_s$ be the $N_R \times N_T$ channel state matrix of the $s^{th}$ subcarrier. Assuming that the channel 106 remains a constant state over the entire duration of the coded OFDM frame, then $Y_{n,b}$ may be expressed by $$Y_{n,b} = [y_{n,b}^1, \ldots, y_{n,b}^{N_{SC}}] \quad \text{(Eq. 4)}$$

where $y_{n,b}^s$ is the $s^{th}$ column vector of $Y_{n,b}$.

Let $M_B \leq N_B$ be the number of coded blocks that the decoder 135 uses to decode $x_{1,1}$. Due to the subcarrier permutation phase in the encoder 130, $x_{1,1}$ is mapped to $$\hat{Y} = [y_{1,1}^1, y_{1,2}^2, \ldots, y_{1,M_B}^{N_B}] \quad \text{(Eq. 5)}$$

The received linear equations corresponding to $x_{1,1}$ may be expressed as:

$$Z = \begin{bmatrix} H_1 y_{1,1}^1 \\ \vdots \\ H_{M_B} y_{1,M_B}^{M_B} \end{bmatrix} + \begin{bmatrix} n_1 \\ \vdots \\ n_{M_B} \end{bmatrix} \quad \text{(Eq. 6)}$$

$$= \begin{bmatrix} H_1 K_{x_{1,1}} \\ \vdots \\ H_{M_B} K_{x_{1,1}} \end{bmatrix} + \begin{bmatrix} n_1 \\ \vdots \\ n_{M_B} \end{bmatrix}$$

$$= HK x_{1,1} + N$$

where H is the composite channel state matrix and may be expressed as:

$$H = [H_1^T \ldots H_{M_B}^T]^T \quad \text{(Eq. 7)}$$

and N is the noise seen on all blocks, which may be expressed as:

$$N = [n_1^T \ldots n_{M_B}^T]^T \quad \text{(Eq. 8)}$$

Accordingly, the rateless decoder 135 may decode and recover $x_{1,1}$ by solving:

$$\hat{x}_{1,1} = (HK)^+ Z \quad \text{(Eq. 9)}$$

where $(\cdot)^+$ is the Moore-Penrose pseudo-inverse. This decoding process is repeated for every transmitted data symbol in the coded OFDM frame received at the receiver 104.

As such, at each individual receiver (e.g., the receiver 104) in the network system 100, the decoding is based on decoding logic that can process a number of linear equations corresponding to the transmitted data. In this regard, the ability of the decoder logic to process the linear equations is independent of the total number of antennas that are utilized by the receiver 104.

Base Station Exemplary Implementation

Figure 5:
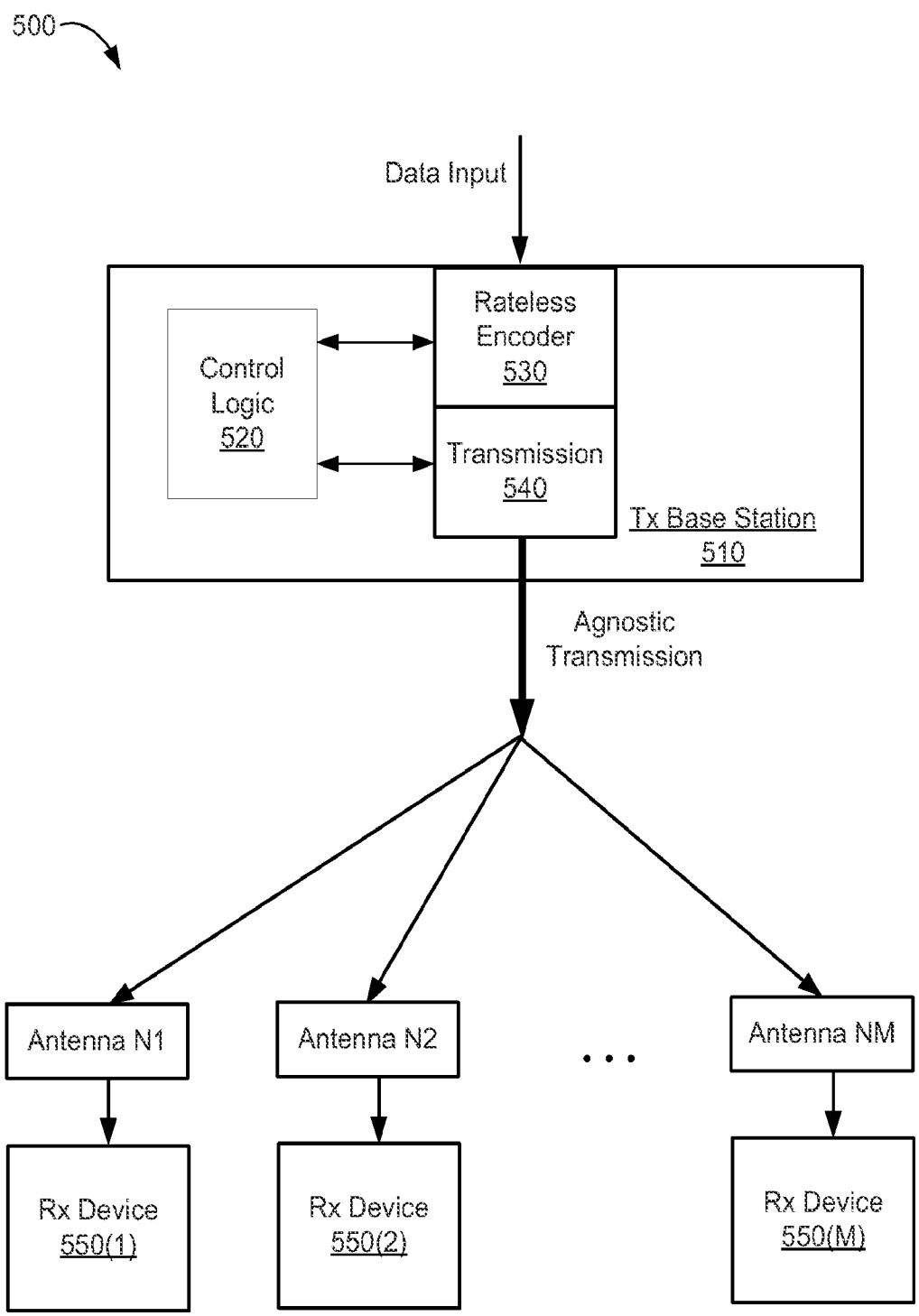
FIG. 5 illustrates an exemplary system in which a base station and a plurality of signal receiver devices communicate in an agnostic fashion.

FIG. 5 illustrates an example of a heterogeneous multi-cast system 500 that includes a base station 510 and a plurality of signal receiver devices 550(1)-550(M) that communicate in an antenna agnostic fashion. The base station 510 includes control logic 520, a rateless encoder 530, and a transmission medium 540. The base station 510 can operate in accordance with examples such as provided with FIG. 1 (see transmitter 102) and a process such as described with FIG. 2 or FIG. 3. Accordingly, the rateless encoder 530 can implement a process such as described with an example of FIG. 2. As such, the base station 510 may ratelessly encode the data input using the rateless encoder 530, and wirelessly multicast the encoded data using the transmission medium 540 to the receiving devices 550(1)-550(M) in an agnostic fashion.

Each one of the receiving devices 550(1)-550(M) includes one or more antenna configurations N. The receiving devices can operate as described with an example of FIG. 1 (see receiver 104), as well as in accordance with a process such as described with an example of FIG. 4. For example, the first receiving device 550(1) includes an antenna configuration of N1, the second receiving device 550(2) includes an antenna configuration of N2, and so forth.

The system 500 employs the wireless multicast techniques which are based upon a physical layer rateless code. System 500 may maintain the efficiency of broadcast-based multicast while allowing each mobile node (e.g., 550(1)) to exploit both diversity and multiplexing gains for energy-efficient multicast reception.

Examples described herein recognize that each OFDM symbol received by an antenna of a MIMO device is a linear combination of multiple transmitted symbols due to the MIMO channel. Consequently, a rateless encoder at PHY level is adopted as the base station 510 may generate an infinite stream of random linear combinations. Each of the receivers 550(1)-550(M) only needs to collect a sufficient number of linearly independent combinations to recover the transmitted symbols. This technique is more efficient than the conventional practice of retransmitting the entire erroneous frames.

With reference to examples such as provided in FIG. 5, the number of transmit and receive antennas are no longer limiting factors in PHY transmissions. Each receiving antenna (e.g., antenna N1) can be regarded as an independent "collector" of linear equations, which are to be solved by the decoder located on each receiving device. Similarly, each transmitting antenna in the system 500 may be regarded as a simple sender of coefficients that may be combined linearly by the MIMO channel. Typically, the larger the number of receiving antennas, the faster the rate at which linear equations may be collected (and data to be decoded). Nonetheless, in many implementations, successful decoding may occur with fewer equations. The bit error rate ("BER") may scale with receiving antenna count, thereby removing the overhead of explicit TX-RX antenna coordination and the need for adjusting transmission signals to accommodate channel state.

Simplified Multicast Grouping.

Additionally, with the techniques disclosed herein, the need for conservatively selecting the diversity and multiplexing gain in order to accommodate a client in an inferior configuration (e.g., low antenna count, or noisy channel) is removed. Instead, the base station 510 sends a stream of coded linear combinations to all devices 550(1)-550(M) in the multicast group. Devices 550(1)-550(M) then decode the transmissions as soon as they have collected a sufficient number of equations. This decoding process simplifies the multicast grouping restrictions and reduces the number of channel accesses needed to reach all downstream clients.

Increased Energy Efficiency.

The error probability in the recovered OFDM symbol may be reduced by using more linear equations for decoding at each client (e.g., 510(1)). However, the improvement in accuracy does not increase linearly with increasing antenna counts. The examples presented herein may optimize energy use by optimizing for either the peak signal-to-noise ratio ("PSNR") or PSNR-per-Joule value of the received multicast stream while ensuring that the received video bit rate remains above the target value.

By employing the agnostic wireless transmitting based upon the rateless encoding/decoding techniques provided herein, among other benefits, successful wireless multicast of data signals to all heterogeneous receivers without sacrificing those receivers with superior antenna capabilities may be achieved.

CONCLUSION

In the foregoing specification, the examples have been described with reference to specific exemplary implementations thereof. It will, however, be evident that various modifications and changes may be made thereto without departing from the broader scope of the disclosure. The specification and drawings are, accordingly, to be regarded in an illustrative sense rather than a restrictive sense.

What is claimed is:

1. A wireless transmitter for transmitting data over a wireless network, the transmitter comprising:
    a physical (PHY) layer to form an uncoded frame comprising a plurality of data symbols representative of a set of data;
    an encoder to (a) convert, using a rateless code, the uncoded frame into a coded frame, wherein the coded frame comprises a plurality of coded blocks that collectively include multiple copies of the plurality of data symbols, and (b) to load the coded blocks onto a plurality of subcarriers;
    one or more antennas to transmit the plurality of subcarriers, and
    wherein the encoder is to place repetitive copies of data symbols onto different subcarriers.

2. The transmitter of claim 1, wherein the encoder (i) is to send a stream of subcarriers on each available spatial dimension if a length of a vector of data symbols in the subcarrier equals the total number of antennas, and (ii) to send the stream of subcarriers periodically to different spatial dimensions if the length of the vector of data symbols in the subcarrier is less than the total number of antennas.

3. The transmitter of claim 1, wherein the encoder is to perform a cyclic rotation to the data symbols in the coded frame according to a channel state of the wireless network.

4. A wireless transmitter for transmitting data over a wireless network, the transmitter comprising:
    a physical (PHY) layer to form an uncoded frame comprising a plurality of data symbols representative of a set of data;
    an encoder to (a) convert, using a rateless code, the uncoded frame into a coded frame, wherein the coded frame comprises a plurality of coded blocks that collectively include multiple copies of the plurality of data symbols, and (b) to load the coded blocks onto a plurality of subcarriers;
    one or more antennas to transmit the plurality of subcarriers,
    wherein the encoder is to map a vector of data symbols in each subcarrier onto the plurality of antennas for transmission.

5. The transmitter of claim 4, wherein the encoder (i) is to send a stream of subcarriers on each available spatial dimension if a length of the vector of data symbols in the subcarrier equals the total number of antennas, and (ii) to send the stream of subcarriers periodically to different spatial dimensions if the length of the vector of data symbols in the subcarrier is less than the total number of antennas.

6. The transmitter of claim 4, wherein the encoder is to perform a cyclic rotation to the data symbols in the coded frame according to a channel state of the wireless network.

7. The transmitter of claim 4, wherein the encoder is to place repetitive copies of data symbols onto different subcarriers.

8. A wireless transmitter for transmitting data over a wireless network, the transmitter comprising:
    a data framer to form an uncoded frame comprising a plurality of data symbols representative of a set of data;
    an encoder to (a) convert, using a rateless code, the uncoded frame into a coded frame, wherein the coded frame comprises a plurality of coded blocks that collectively include multiple copies of the plurality of data symbols, and (b) to load the coded blocks onto a plurality of subcarriers;
    one or more antennas to transmit the plurality of subcarriers,
    wherein the encoder is to perform a cyclic rotation to the data symbols in the coded frame according to a channel state of the wireless network.

9. The transmitter of claim 8, wherein the encoder (i) is to send a stream of subcarriers on each available spatial dimension if a length of a vector of data symbols in the subcarrier equals the total number of antennas, and (ii) to send the stream of subcarriers periodically to different spatial dimensions if the length of the vector of data symbols in the subcarrier is less than the total number of antennas.

10. The transmitter of claim 8, wherein the encoder is to place repetitive copies of data symbols onto different subcarriers.

* * * * *